United States Patent [19]
Potts et al.

[11] 3,778,010
[45] Dec. 11, 1973

[54] AIRCREW ESCAPE SYSTEMS

[75] Inventors: Frederick John Potts, Brough;
Geoffrey Charles Wickenden,
Kingston-Upon-Hull, both of
England

[73] Assignee: Hawker Siddeley Aviation Limited,
Surrey, England

[22] Filed: Jan. 14, 1972

[21] Appl. No.: 217,896

[30] Foreign Application Priority Data
Jan. 15, 1971 Great Britain...................... 2,166/71

[52] U.S. Cl....... 244/121, 244/122 AF, B64d/25/00
[58] Field of Search............... 244/122 AF, 122 AE, 244/122 A, 121; 102/49.5, 23; 49/141

[56] References Cited
UNITED STATES PATENTS

| | | | |
|---|---|---|---|
| 3,729,154 | 4/1973 | Deplante | 244/122 AF |
| 3,486,410 | 12/1969 | Drexelius et al. | 89/1 B |
| 3,465,482 | 9/1969 | Chandler | 102/49.5 |
| 3,336,868 | 8/1967 | Rush et al. | 102/24 HC |
| 3,135,163 | 6/1964 | Mechlin et al. | 89/1.817 |
| 3,561,703 | 2/1971 | Stencel | 244/122. AF |
| 3,185,090 | 5/1965 | Weber | 102/49.5 |
| 3,248,072 | 4/1966 | Schimmel | 244/122 A |
| 3,139,031 | 6/1964 | Schroter et al. | 102/49.5 |

FOREIGN PATENTS OR APPLICATIONS
698,226  10/1953  Great Britain...................... 49/141

*Primary Examiner*—Duane A. Reger
*Assistant Examiner*—Galen L. Barefoot
*Attorney*—Howard L. Rose et al.

[57] ABSTRACT

A canopy transparency break-up system is provided, for use in emergency escape from an aircraft through the cockpit canopy, in which miniature detonating cord (MDC) is held in place around the periphery of the transparency, or a selected area of the transparency, and is formed into loops at intervals which loops act as crack iniators when the cord is detonated. The cord is clamped in place, without adhesive, by means of retaining plates of springy steel which are bolted to the canopy frame and are segmented by transverse slots at intervals along their lengths, these plates having appropriate extensions or tongues in the regions where the cord loops occur. The cord ends are brought into contiguity within a common detonator unit the axis of which is at right angles to the axes of the cord ends.

8 Claims, 8 Drawing Figures

3,778,010

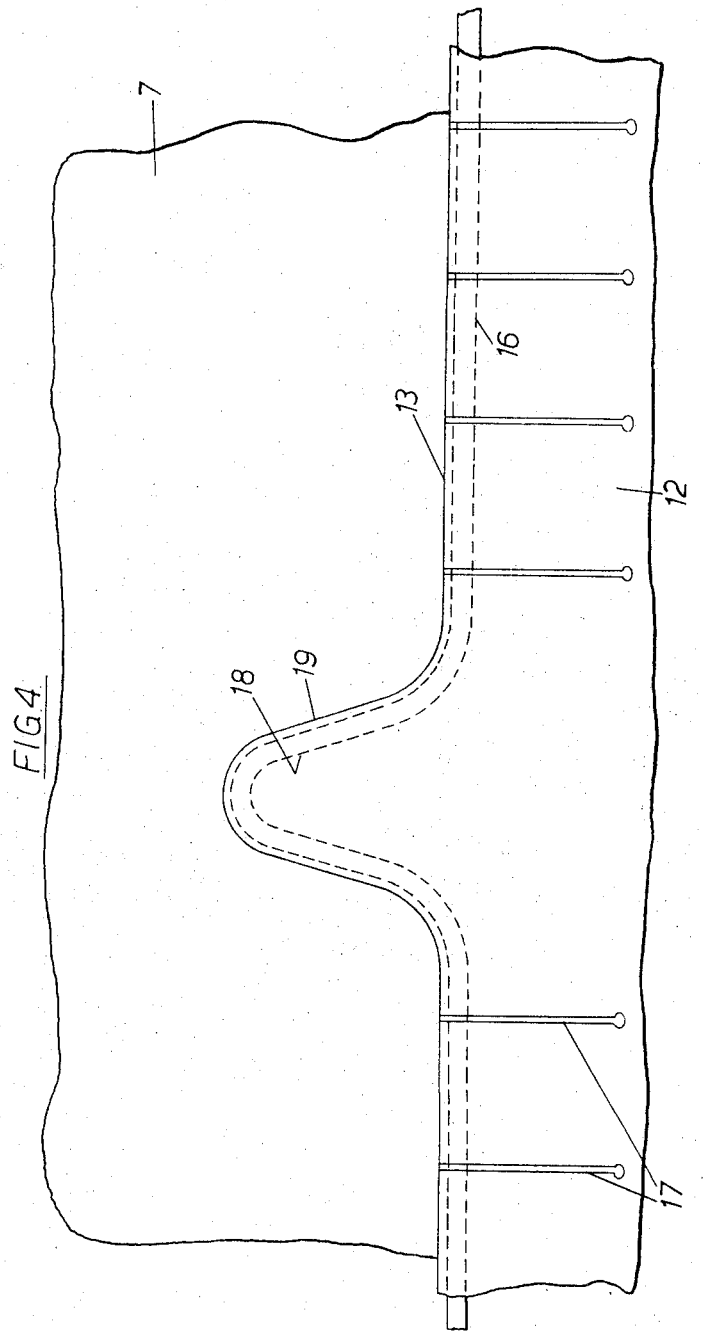

AIRCREW ESCAPE SYSTEMS

This invention relates to the emergency escape of aircrew from an aircraft.

It is well known to be sometimes necessary, because of an aircraft malfunction or combat damage, for aircrew to escape making use of an ejector seat. Actuated by a crew member, the seat is explosively ejected and once a safe height is attained there is automatic parachute deployment.

Because of the short time available under emergency conditions removal of the complete canopy may not be feasible. Where there is adequate forward speed, release of the canopy locking mechanism will allow complete removal by airflow action. However, for low or zero speed conditions where there is negligible airflow assistance, as for example on vertical take-off aircraft during the hover and transition mode, emergency ground ejection or in the case of a submerging aircraft, it is more acceptable to eject through the canopy.

A known method of ejection through the canopy relies upon the initial upward seat movement where a projection on top of the seat acts as a canopy breaker forming an egress opening. A disadvantage of this method is that there is no guarantee that the canopy will break in a manner to give a hole of the right size and shape.

As a means of overcoming this problem an explosive device has been employed known as 'Miniature Detonating Cord' or 'Flexible Linear-Shaped Charge.' This cord is attached around the canopy periphery and connected to suitable detonation means. Break-up of the canopy occurs when the cord is detonated, the transparency material absorbing blast energy with resultant fracture. Such an MDC installation was initially intended for ground escape initiated from either inside or outside the cockpit. Then its in-flight advantage was recognised where ejector seat failure necessitated a manual exit. And now the system has been developed to the stage of interconnection between the MDC detonation and the seat ejection, while still maintaining the ability for manual MDC firing, so that MDC detonation is available for all types of escape. In the case of automatic detonation during ejector seat operation it is possible to arrange that transparency fragmentation by the MDC is completed or may be assisted by the seat canopy breaker previously mentioned. For manual firing, the crew member withdraws a sear from a detonator firing pin in the detonator unit.

The miniature detonating cord is a linear explosive charge whose explosive content is dependent upon energy requirements for a given canopy and which is contained as the core of a tube, lead being the preferred tube material. It can be likened in appearance to cored solder with the explosive charge in place of the flux. As a protection against the ingress of moisture and cracking, and to allow better handleability, the cord is contained within an outer sheath of plastic.

One means of alleviating possible degradation of the MDC under the imposed environment, including vibration considerations, is to contain the sheathed cord in an elastomer back-up extrusion, substantially semicircular in cross-section. It is also very necessary to maintain the MDC and its back-up extrusion in intimate contact with the transparency.

The efficiency of the canopy break-up will depend on obtaining the maximum blast effect from the cord and directing it in such a way as to cause released blast energy to be absorbed by the canopy. This can be substantially influenced by cord shape; thus, a chevron, or inverted V cord, allows better cutting of the material because of the assistance of the Munroe Jet Effect. However, although it gives a definite cut line, chevron cord provides less fragmentation velocity or dispersion of the broken fragments. Circular section MDC is more easily adaptable to a canopy type installation but gives a radial blast effect so that a substantial part of the blast could be directed away from the canopy with the danger of blow-back of molten lead or fragmented cord and undesirably high blast pressures.

The elastomer back-up extrusion will overcome this problem to some extent by restricting the blow-back. It is an object of the invention not only to overcome this problem but also to impart the energy and hence velocity to remove fragments from the path of the crew member being ejected.

According to the present invention, the MDC is provided with backing or retaining plates arranged, without the use of adhesive, to maintain the cord against the canopy transparency at a desired pressure per inch length of cord throughout the various temperature and pressure changes imposed by flight and ground conditions, while at the same time affording a measure of detonation protection.

One installation in accordance with the invention is shown by way of example in the accompanying drawings, in which:

FIG. 4 is a side view of a portion of the retaining plate,

Figure 1:
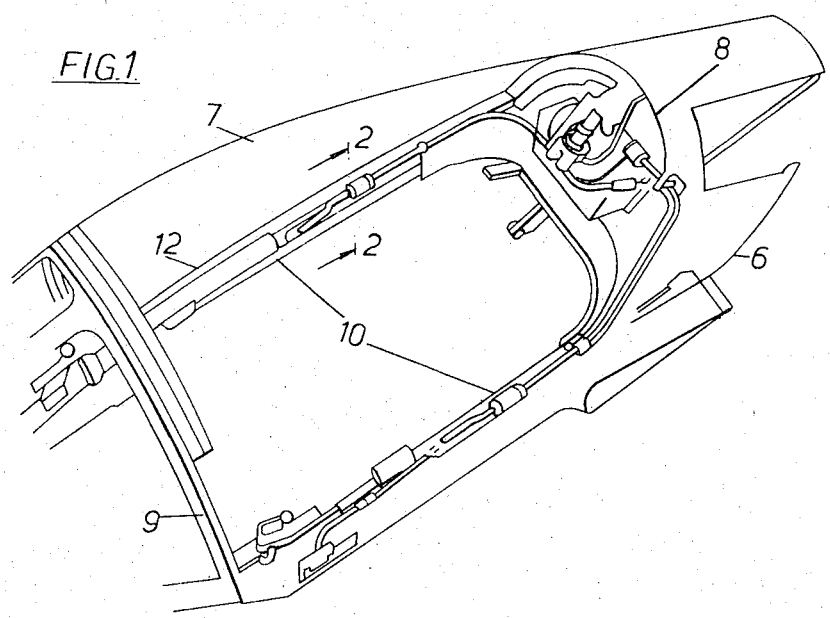
FIG. 1 shows a typical aircraft cockpit canopy.

In FIG. 1, a cockpit canopy 6 has a transparent hood 7 which is bounded by a rear arch 8, a forward arch 9 and canopy sill structure 10.

Figure 2:
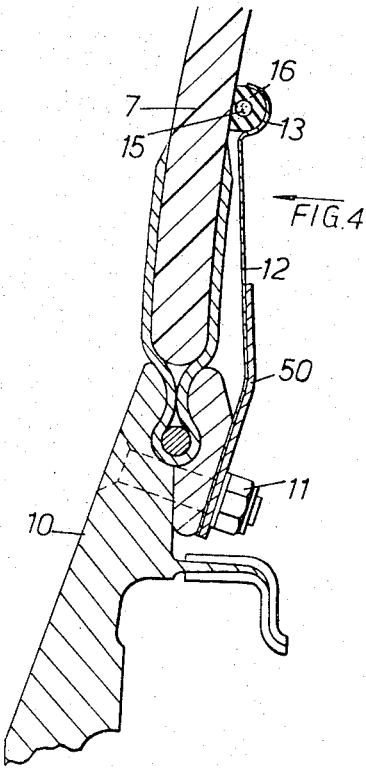
FIG. 2 is a section through the canopy sill taken on the line 2—2 of FIG. 1.
Figure 3:
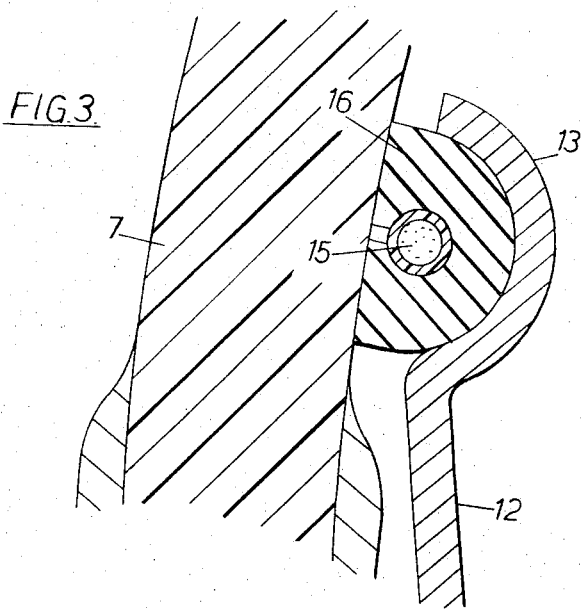
FIG. 3 is an enlarged detail of part of FIG. 2.

FIG. 2 shows that the transparency 7 is attached to the sill structure 10 by suitable bolted attachments 11 and, although not shown, similar attachments are employed at the forward and rear arches. Also incorporated with this bolted assembly, and backed for a portion of their width by stiffening plates 50, are miniature-detonating-cord retaining plates 12 shaped in part-circular fashion as at 13 to retain the cord 15 contained within an elastomer rubber back-up extrusion 16. An enlarged detail of this is shown in FIG. 3. The plates 12 are manufactured from any suitable material but we have found that steel plate, having spring characteristics, allows the cord to be maintained in intimate contact with the canopy transparency and will, additionally, afford some crew protection on cord detonation.

It has been our experience that because of the varying canopy profiles of a given design it is difficult to manufacture retaining plates of adequate length whose matching profiles will be within an acceptable tolerance. The inability to achieve this could result in variable cord pressure upon the canopy with a possible variation in detonation strength and the stiffness of the plate would not permit local adjustments to be accurately made. To overcome this, and referring to FIG. 4, it is proposed to segment the plates as shown by means of suitably-spaced saw cuts 17 along the lengths of retaining plate. One of the major advantages of the segmented retaining plate is the ability to install and replace the cord without disturbing the attachment bolts, which may therefore be sealed and common to the canopy attachments.

It may be desirable to assist the break-up of the canopy transparency by initiating cracks from the edge of the material. Whereas it would be possible to extend the MDC farther across the canopy surface this is not aways suitable because, due to the presence of the back-up extrusion, there could be considerable vision restriction.

By bending or thickening the MDC it is possible to increase the local explosive content although local thickening would complicate cord production. It is a further aspect of the invention to incorporate into the peripheral run of MDC local loops which on detonation will give a component detonation force substantially at right angles to the canopy edge members. The position and number of loops is dependent on the number of initiated cracks required. FIG. 4 indicates a typical cord loop 18, and the retaining plates 12 have matching local tongues or extensions 19 to provide the necessary back-up.

The explosive which is used in MDC can be detonated by hot fragments from a standard detonator contained within a mechanical detonator unit, this method being considered more reliable than electrical initiation for an escape system. Currently one continuous length of MDC is used around the complete periphery and both ends of the cord terminate within the detonator unit. Known methods of cord detonation have the axis of the detonator and that of the cord co-incident, this being known as 'end on' detonation. It is desirable to have the cord ends sealed but with a one piece cord it may not be possible, due to variations in aircraft manufacture, to guarantee a standard length requirement, and it would be necessary to cut off any surplus length and reseal before assembly to the detonator. It is another aspect of our invention to overcome this problem by the use of a detonator having its axis set at right angles to the axes of the two widths of cord — which are in effect ends of a single loop. By this means we obtain a fail safe detonation feature, both ends being detonated by a single charge so that should there be a break at some point along the cord length this will not interrupt the detonation as would be the case with initiation at one end only. By the provision of wells adjacent to the detonator anvil any surplus cord can be coiled without interfering with the end seals.

Figure 5:
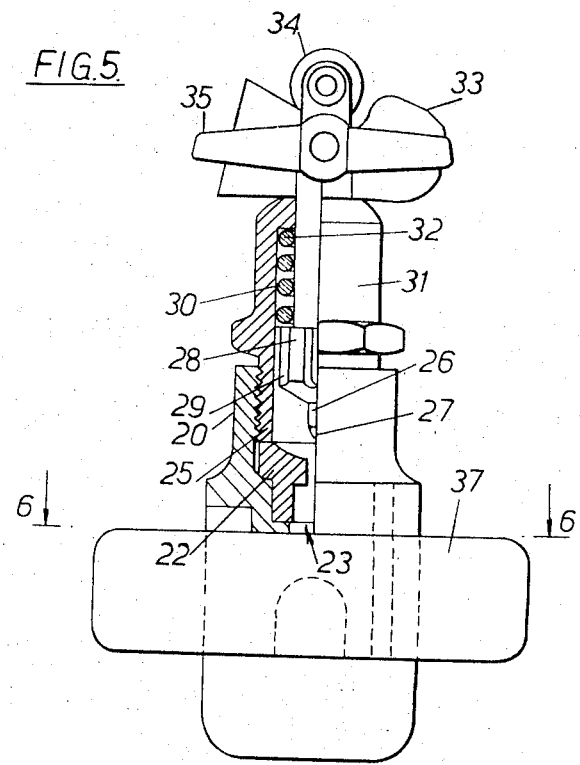
FIG. 5 shows a detonator unit.
Figure 6:
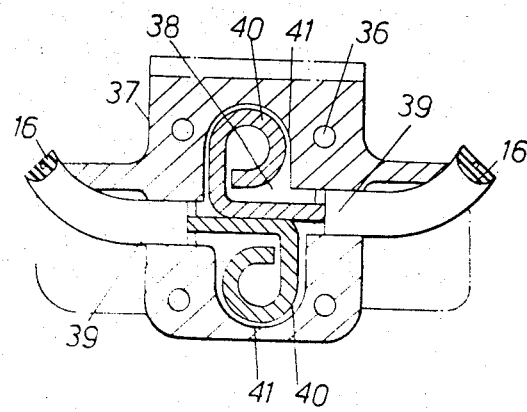
FIG. 6 is a view in section on the line 6—6 of FIG. 5.

FIGS. 5 and 6 show a typical detonator unit according to the invention comprising a main detonator body 20 bored out at its lower end to accept a standard detonator 22 and with its upper end threaded to accept a firing mechanism assembly 25. The mating of parts 20 and 25 firmly locates the detonator in position. The firing mechanism comprises a firing pin 26 pointed at its impact end 27 and having a portion 28 of increased diameter containing a number of gas grooves 29 and able to slide freely within a bore 30 of a retaining housing 31.

The firing pin is held in safety against a spring 32 by a sear 33. The firing pin shaft is slotted to accept the sear and mounted at its outer end is a roller 34 for easy withdrawal of the sear when required. A safety pin 35 is fitted at the sear to prevent inadvertent firing when the aircraft is not in service.

The whole of the detonator assembly is attached by bolts 36 on to a base unit 37. The base unit is machined away internally at 38 to a depth sufficient to accommodate the MDC.

Each end of the cord assembly is inserted into the base at 39, the back-up extrusion 16 terminating as shown whilst the two terminal lengths of MDC lie contiguously beneath the firing pin and transverse to the detonator axis. Surplus cord 40 is coiled away to each side in the wells 41.

With the removal of the sear the firing pin 27 strikes the detonator, the MDC itself being detonated by the impact of the resultant hot fragments passing through a central part 23.

Referring again to FIG. 1, the retaining plates form a continuous run with the MDC terminating close to the detonator unit so that there is no unsupported cord.

Figure 8:
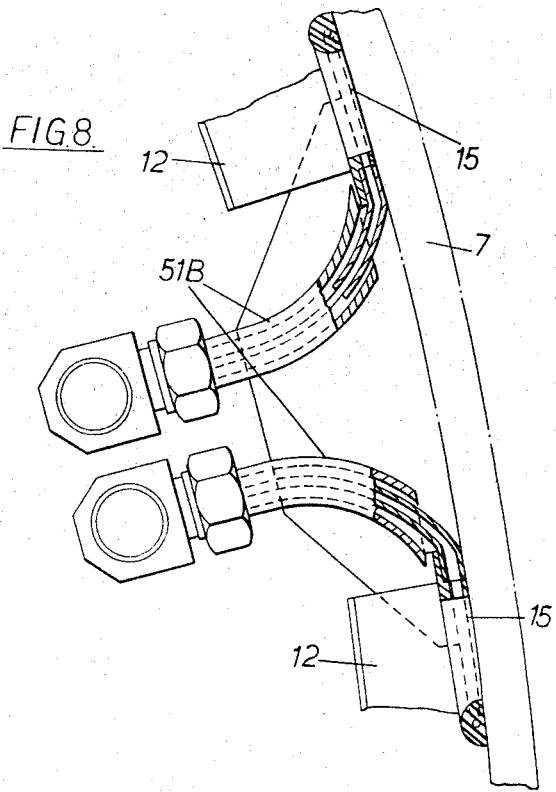
FIG. 8 is a view in the direction of the arrow Y of FIG. 7.
Figure 7:
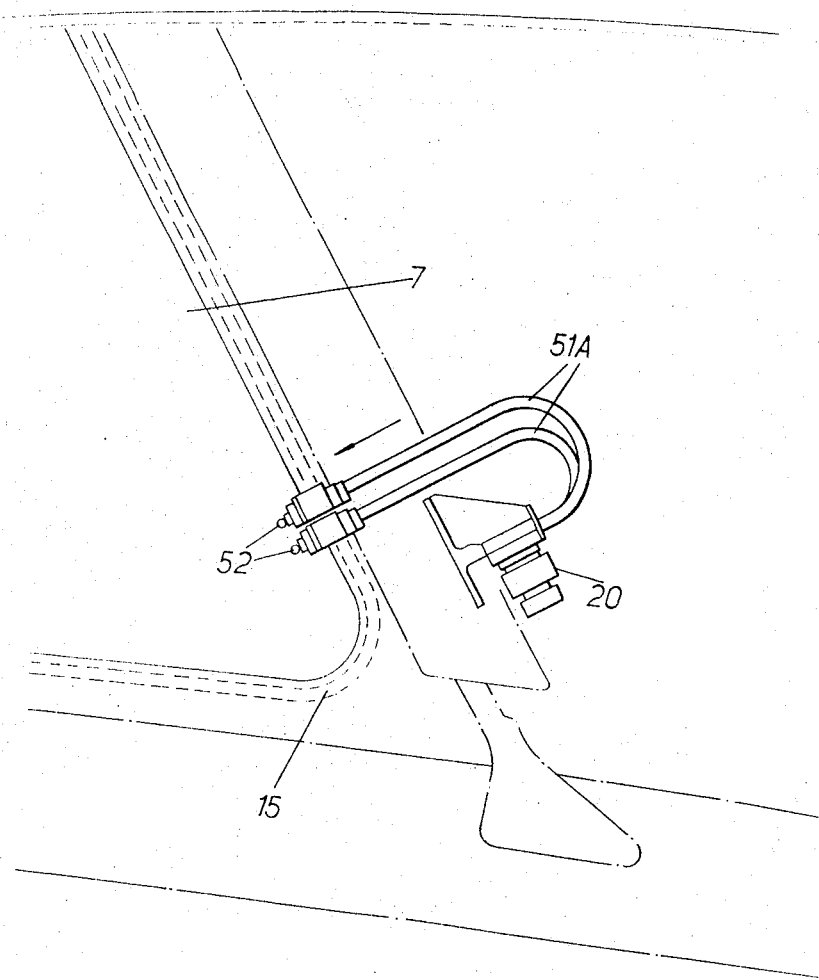
FIG. 7 shows a particular detonating cord terminal arrangement.

If on a particular installation the plates have to be terminated at some distance from the detonator unit then it will be necessary to stick the elastomer back-up extrusion to the transparency by suitable means. However, where the cord has to pass unsupported across an open space it will be essential to protect it against vibration and wear which could create a break in continuity. This can be achieved by conducting the cord within conduits 51A, 51B (FIGS. 7 and 8) suitably connected at their ends to the retaining plates, on the one hand, and the detonator unit, on the other hand, the contained air space within the conduit tubes being filled with a suitable synthetic plastics moulding compound through nipples 52.

While in the arrangement described MDC of various cross-sectional shapes can be employed, it is preferred to use the cord described in our U.S. Pat. application Ser. No. 227,433.

What we claim is:

1. An aircraft canopy emergency break-up system comprising: a detonating cord and retaining plates for maintaining said cord in intimate contact with an aircraft canopy at a desired pressure per inch throughout various temperature and pressure changes imposed by flight and ground conditions while affording a measure of detonation protection, said retaining plate is segmented by transverse cuts extending partially across the plate at intervals along its length.

2. A system according to claim 1 wherein is provided means for securing said retaining plate along its continuous longitudinal edge to the canopy frame, the slotted longitudinal edge comprising a part circular recess to receive said detonating cord.

3. A system according to claim 2, wherein the cord, held by the retaining plates, is sheathed within an elastomeric extrusion.

4. A system according to claim 2, wherein the retaining plates are made of springy metal plate.

5. A system according to claim 2 wherein said detonating cord is arranged with local loops to act as initiators of cracks transverse to the longitudinal edge of said retaining plates, said retaining plates having local extensions to back up said loops.

6. A system according to claim 2 further comprising a detonating unit and wherein the ends of said detonator cord are received in said detonating unit of which the axis of detonation is at right angles to the axes of the cord ends.

7. A system according to claim 6, wherein, within the detonator unit, the cord ends are brought into side-by-side contiguity, and wells are provided to receive any surplus cord.

8. A system according to claim 6, wherein, between the last retaining plates and the detonator unit, portions of the MDC that would otherwise be unsupported are contained in conduits.

* * * * *